United States Patent Office 3,226,439
Patented Dec. 28, 1965

3,226,439
POLYHALOGENATED ALKYL IMINES AND HYDRAZONES AND METHOD OF PREPARATION
William J. Middleton, Wilmington, Del., assignor to E. I. du Pont de Nemours and Company, Wilmington, Del., a corporation of Delaware
No Drawing. Filed Jan. 10, 1963, Ser. No. 250,501
14 Claims. (Cl. 260—566)

This invention relates to new fluorinated, nitrogen-containing organic compounds and to methods for their preparation.

This application is a continuation-in-part of my co-assigned application Serial No. 134,815, filed August 30, 1961.

The compounds of this invention are of the formula:

(1)
$$R_h-CF_2-\overset{NR}{\underset{\|}{C}}-CF_2-R_h'$$

wherein $R_h$ and $R_h'$ may be the same or different and are halogen of atomic number 9–17 or haloalkyl of up to 6 carbons (i.e., 6 carbons or less) in which all halogens are of atomic number 9–17 (i.e., fluorine or chlorine); and R is hydrogen, amino (—$NH_2$) or alkyl of up to 18 carbons.

The preferred compounds are those of the above formula wherein $R_h$ and $R_h'$ each represent chlorine or fluorine, or perfluoroalkyl, chloroperfluoroalkyl or ω-hydroperfluoroalkyl of up to 6 carbons; and R is hydrogen, amino or alkyl of up to 7 carbons.

The polyhaloalkylidene imines (R=H) are prepared by reacting hydrazoic acid ($HN_3$) with a polyhalothioketone of the formula:

(2)
$$R_h-CF_2-\overset{S}{\underset{\|}{C}}-CF_2-R_h'$$

wherein $R_h$ and $R_h'$ are as defined above.

As a practical matter, the reaction is carried out at a temperature between —50° C. and 0° C. followed by warming of the reaction mixture to a temperature between 20° C. and 100° C. This two-step procedure is a safety measure employed to keep the exothermic reaction under proper control when using elementary reaction equipment not suitable for rigorous process conditions. Preferably, the acid and thioketone are contacted at a temperature between —20° C. and 0° C., and the reaction mixture is thereafter warmed to a temperature between 40° C. and 60° C.

The pressure at which the reaction is conducted is not critical; and, therefore, it is most convenient to operate at ambient pressure.

The hydrazoic acid and polyhalothioketone react in equimolar amounts, and therefore, these reactants are preferably used in a 1:1 molar ratio. However, an excess of either reactant can be employed at the expense of process efficiency.

Preferably the hydrazoic acid and polyhalothioketone are contacted in a mutual inert solvent. Any mutual solvent which is normally liquid and will not react with the reactants and products is satisfactory. Examples of suitable solvents are chloroform, methylene chloride, dimethyl and diethyl ethers, tetrahydrofuran, cyclohexane, etc. The amount of solvent, if any, is not critical and it can equal or exceed the weight of reactants by many fold.

To obtain optimum temperature control over the reaction, it is preferred to dissolve the hydrazoic acid in the reaction medium, add the solution of acid to a reactor cooled, e.g., to —15° C. and then incrementally add all the thioketone. After this addition is completed, the reaction mixture is warmed as described above until reaction is complete, as evidenced by cessation of gas evolution. Thereafter, the desired products are isolated by conventional means, e.g., by fractional distillation as illustrated in Example I.

Examples of polyhalothioketones of Formula 2 which are useful in the above process are octafluoro-2-butathione $$CF_3-\overset{S}{\underset{\|}{C}}-CF_2-CF_3$$

tetradecafluoro-4-heptathione $$CF_3-CF_2-CF_2-\overset{S}{\underset{\|}{C}}-CF_2-CF_2-CF_3$$

hexafluoro-2-propathione $$CF_3-\overset{S}{\underset{\|}{C}}-CF_3$$

4H-heptafluoro-2-butathione $$HCF_2-CF_2-\overset{S}{\underset{\|}{C}}-CF_3$$

1-chloroheptafluoro-3-butathione $$Cl-CF_2-CF_2-\overset{S}{\underset{\|}{C}}-CF_3$$

and the like.

The above are known compounds, prepared as described in U.S. 2,970,173 either by:

(1) Reaction of a secondary polyfluoroalkyl iodide of at least three carbons in the alkyl group with a phosphorus polysulfide, e.g., $P_2S_5$ or $P_4S_3$, in the liquid or vapor state at elevated temperatures.

(2) Heating a polyfluoroketone with phosphorus pentasulfide for several hours at 200° to 300° C. under autogenous pressure.

(3) Reacting a secondary perfluoroalkanethiol with a hydrogen fluoride acceptor, e.g., sodium fluoride.

(4) Reacting sulfur with a perfluoroolefin of at least three carbon atoms at 400° to 650° C.

(5) Thermal decomposition of selected polyfluorinated dithietanes at 450° to 700° C.

The compounds of Formula 1 wherein R is alkyl, i.e., the N-alkyl polyhaloalkylidene imines, are prepared by a second method which can also be used to prepare the polyhaloalkylidene imines (R=H). This method comprises two process steps which are, in part, schematically represented as follows:

(A)
$$R_h-CF_2-\overset{O}{\underset{\|}{C}}-CF_2-R_h' + NH_2R \longrightarrow R_h-CF_2-\overset{OH}{\underset{|}{\underset{NHR}{C}}}-CF_2-R_h'$$

(B)
$$R_h-CF_2-\overset{OH}{\underset{|}{\underset{NHR}{C}}}-CF_2-R_h' \longrightarrow R_h-CF_2-\overset{NR}{\underset{\|}{C}}-CF_2-R_h' + H_2O$$

wherein R, $R_h$ and $R_h'$ have the previously indicated meanings.

In step (A) the polyhaloketone is contacted with at least one molar equivalent of ammonia (R=H) or primary alkylamine (R=alkyl) at a temperature maintained between —50° and 10° C. A normally liquid reaction medium is preferably employed to assist in dissipating the heat which is spontaneously generated when the reactants are admixed. For optimum control of the reaction, it is preferred that all of the ammonia or primary alkylamine be added incrementally to a cold (—15° C. or less) solution of polyhaloketone while the temperature of the reaction mixture is maintained at or below —15° C. The desired product, i.e., the amino, hydroxy-substituted polyhaloalkane can be isolated, if desired, by conventional techniques.

Examples of polyhaloketones which can be employed in step (A) are perfluorodiethyl ketone, s-dichlorotetrafluoroacetone, 1H,7H-dodecafluoroheptane-3-one, trichlorotrifluoroacetone, perfluoroacetone, 1H,9H-hexadecafluorononane-5-one, 1,16-dichloroperfluoropentadecane-8-one and tetrachlorodifluoroacetone, all of which are known compounds.

Suitable amines ($NH_2R$) for step (A) are, e.g., methylamine, butylamine, heptylamine, decylamine, dodecylamine, tetradecylamine and octadecylamine, all of which are known compounds.

In step (B), the intermediate from step (A), i.e., the amino, hydroxy-substituted polyhaloalkane, is dehydrated by warming a mixture of the intermediate, a dehydrating agent and an acid acceptor to at least its reflux temperature. The intermediate from step (A) can be employed in this step either in its pure or crude form, i.e., the dehydrating agent and acid acceptor can be added directly to the porduct mixture from step (A). The desired imine can be removed from the product mixture either by permitting it to distill off during the dehydration step or by subsequently distilling the product mixture. The imine may then be purified by fractional distillation.

For optimum control of step (B), it is preferred that the dehydrating agent be incrementally added to the mixture of amino, hydroxy-substituted polyhaloalkane and acid acceptor and the resulting mixture then heated to reflux temperature, which will vary depending upon the particular reactants employed and the nature of the added reaction medium if any.

The dehydrating agent can be any compound known to be useful in this capacity, e.g., $POCl_3$, $P_2O_5$, etc. Phosphorous oxychloride ($POCl_3$) is the preferred dehydrating agent.

Although it is not essential, the use of a liquid reaction medium in steps (A) and (B) is preferred. The medium can either be a normally liquid tertiary amine, which functions both as a medium and as an acid acceptor, or it can be any normally liquid medium which is inert to the reactants and products. Preferably the medium is a solvent for the reactants and products of steps (A) and (B). When a reaction medium is employed in step (A), it usually will also serve as the medium for step (B); however, a different medium can be employed in each step, e.g., when the intermediate from step (A) is isolated before step (B) is performed. Suitable solvents include chloroform, pyridine, triethylamine, benzene, chlorobenzene, tetrachloroethane, cyclohexane, methylcyclohexane, hexane, heptane, diethyl ether, dibutyl ether, dioxane tetrahydrofuran, etc. The preferred solvents are pyridine and triethylamine.

The function of the acid acceptor is to remove the acid formed by reaction of the dehydrating agent with the water liberated in the reaction. Preferably the acid acceptor also functions as the reaction medium. However, an acid acceptor which does not serve both functions, e.g., sodium carbonate may be employed, if desired.

The amount of dehydrating agent and acid acceptor employed in step (B) is not critical, but for maximum conversion of the intermediate to desired imine, the molar ratio of dehydrating agent to intermediate should be at least 1:1, and the acid acceptor should be present in an amount sufficient to consume all acid liberated during the reaction.

The pressure at which steps (A) and (B) are conducted is not critical; and therefore, it is most convenient to operate at ambient pressure.

The method of preparing the hydrazones of this invention ($R=NH_2$) is, in part, schematically represented as follows:

(a)

$$R_h\text{—}CF_2\text{—}\overset{\overset{NH}{\|}}{C}\text{—}CF_2\text{—}R_h' + NH_2NH_2 \longrightarrow R_h\text{—}CF_2\text{—}\overset{\overset{NH_2}{|}}{\underset{\underset{NH\text{—}NH_2}{|}}{C}}\text{—}CF_2\text{—}R_h'$$

(b)

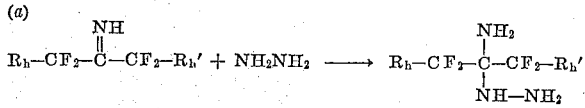

wherein $R_h$ and $R_h'$ have their previously indicated meanings.

In step (a), a polyhaloalkylidene imine of this invention (R=H) is reacted with at least one molar equivalent of hydrazine at a temperature maintained between —50° and 10° C. For optimum control of the reaction, it is preferred that all of the hydrazine be added incrementally to a cold (—15° C. or less) solution of the polyhaloalkylidene imine while the temperature of the reaction mixture is maintained at or below —15° C. The amino, hydrazino-substituted product can be isolated, if desired, by conventional techniques.

In step (b), the amino, hydrazino-substituted intermediate from step (a) is de-aminated by heating it together with a de-aminating agent to a temperature of 90° to 250° C. The de-aminating agent can be added directly to the product mixture form step (a) or to the intermediate from that step after it has been isolated by conventional techniques.

The de-aminating agent can be any compound known to be useful in this capacity, e.g., the strong dehydrating agents mentioned above as being suitable for step (B) of the process for preparing the imines of this invention. The preferred de-aminating agent is phosphorous pentoxide. Although the amount of de-aminating agent is not critical, best yields of polyhaloalkylhydrazone are obtained when the molar ratio of de-aminated agent to intermediate from step (a) is at least 1:1. Generally there is no advantage in letting this ratio exceed 2:1.

Although it is not essential, an inert normally liquid reaction medium is preferably employed in steps (a) and (b) to moderate the reaction. Suitable media are those mentioned above in connection with steps (A) and (B) of the process for preparing the polyhaloalkylidene imines and N-alkyl polyhaloalkylidene imines.

The pressure employed in steps (a) and (b) is not critical; and therefore, it is most convenient to operate at ambient pressure.

The products of this invention are useful per se and as intermediates for the preparation of products useful in biological applications.

The examples which follow illustrate but do not limit this invention. Example II constitutes a specific preferred embodiment of the invention.

*Example 1*

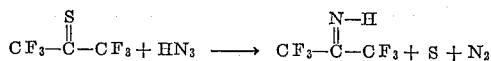

One hundred milliliters of 1 N hydrazoic acid in chloroform was cooled to —15° C. and 18.2 g. (0.1 mole) of hexafluorothioacetone was added dropwise. A vigorous evolution of nitrogen occurred. The blue color faded and a yellow precipitate formed. The reaction mixture was then warmed to 50° C. in 5 to 10 minutes and the gases that evolved were condensed to an ice-cooled trap. The condensate was distilled through a spinning band still to give 5 ml. of hexafluoroisopropylidene imine as a colorless liquid, B.P. 15 to 17° C., contaminated with about 6% of chloroform, as determined by vapor-phase chromotagraphic analysis. A purer sample of hexafluoroisopropylidene imine was prepared by substituting chlorobenzene and tetrachloroethane, respectively, for the chloroform, but in both cases a lower yield was obtained. The pure imine has a B.P. of 16-16.5° C., M.P. ca. —47° C., $d_4^0$ ca. 1.51.

Nuclear magnetic resonance, infrared, and mass spectrographic data are consistent with the assignment of the structure

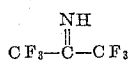

to the product.

*Analysis.*—Calcd. for $C_2HF_6N$: C, 21.83; H, 0.61; F, 69.07; N, 8.46. Found: C, 21.81; H, 0.76; F, 68.81; N, 8.16

Two higher boiling products were also isolated from the reaction of hydrazoic acid with hexafluorothioacetone by distillation of the higher boiling residue. Thus, a very volatile, colorless crystalline solid, b.p. 50–65° C., M.P. 79.5° C. (sealed capillary) was isolated in low yields. Elemental analysis and examination of its infrared and n-m-r spectra indicate this compound to be 3,3-bis-trifluoromethyl-1,2-diazacyclopropane,

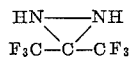

*Analysis.*—Calcd. for $C_3H_2F_6N_2$: C, 20.01; H, 1.12; F, 63.32; N, 15.56. Found: C, 20.76; H, 1.49; F, 63.54; N, 15.72

A still higher boiling fraction, B.P. 89–90° C., $n_D^{24}$ 1.3368, was not separated cleanly by distillation. The presence of infrared absorption bands at 2.90μ and 2.95μ suggested the presence of an amino group and a band at 4.65μ suggests an azide group. This fraction may consist chiefly of 2-amino-1,1,1,3,3,3-hexafluoropropyl-2-azide,

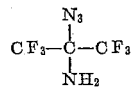

*Analysis.*—Calcd. for $C_3H_2F_6N_4$: C, 17.3; H, 0.97; F, 54.8; N, 26.9. Found: C, 19.35; H, 1.46; F, 54.90; N, 22.81

In the right column of Table I are listed the products that are obtained when the thioketones listed in the left column are substituted for the perfluorothioacetone of Example I in the process of Example I.

TABLE I

| Reactants | Products |
|---|---|
| 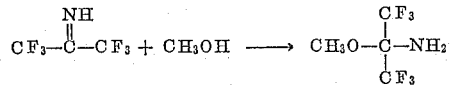$CF_3-\overset{S}{\underset{\|}{C}}-CF_2CF_3+HN_3$ | $CF_3\overset{NH}{\underset{\|}{C}}CF_2CF_3+F_3C-\overset{HN——NH}{\underset{\diagdown\diagup}{C}}-CF_2-CF_3$ |
| $C_3F_7-\overset{S}{\underset{\|}{C}}-C_5F_{11}+HN_3$ | $C_3F_7-\overset{NH}{\underset{\|}{C}}-C_5F_{11}+C_3F_7-\overset{HN——NH}{\underset{\diagdown\diagup}{C}}-C_5F_{11}$ |
| $HCF_2CF_2-\overset{S}{\underset{\|}{C}}-CF_3+HN_3$ | $HCF_2CF_2-\overset{NH}{\underset{\|}{C}}-CF_3+HCF_2CF_2-\overset{HN——NH}{\underset{\diagdown\diagup}{C}}-CF_3$ |
| $ClCF_2CF_2-\overset{S}{\underset{\|}{C}}-CF_3+HN_3$ | $ClCF_2CF_2-\overset{NH}{\underset{\|}{C}}-CF_3+ClCF_2CF_2-\overset{HN——NH}{\underset{\diagdown\diagup}{C}}-CF_3$ |
| $ClCF_2-\overset{S}{\underset{\|}{C}}-CF_2Cl+HN_3$ | $ClCF_2-\overset{NH}{\underset{\|}{C}}-CF_2Cl+ClCF_2-\overset{HN——NH}{\underset{\diagdown\diagup}{C}}-CF_2Cl$ |
| $C_7F_{15}-\overset{S}{\underset{\|}{C}}-C_7F_{15}+HN_3$ | $C_7F_{15}-\overset{NH}{\underset{\|}{C}}-C_7F_{15}+C_7F_{15}-\overset{HN——NH}{\underset{\diagdown\diagup}{C}}-C_7F_{15}$ |

Hexafluoroisopropylidene imine (Example I) reacts with methanol and dienes, as illustrated below:

(1) *Methyl alcohol*:

$$CF_3-\overset{NH}{\underset{\|}{C}}-CF_3 + CH_3OH \longrightarrow CH_3O-\overset{CF_3}{\underset{\underset{CF_3}{|}}{\overset{|}{C}}}-NH_2$$

Methyl alcohol, 0.75 ml. (0.02 mole) was pipetted into a 2-ml. (0.018 mole) sample of hexafluoroisopropylidene imine cooled to −10° C. The reaction mixture was warmed to room temperature and distilled through a semimicro spinning band still. There was obtained 1.7 g. of 2-methoxy-2-amino-hexafluoropropane as a colorless liquid, B.P. 91–92° C.; $n_D^{24}$, 1.3149. The infrared and n-m-r spectra were consistent with the proposed structure.

*Analysis.*—Calcd. for $C_4H_5F_6NO$: N, 7.11. Found: N, 7.11

(2) *Hexafluoroisopropylidene imine / dimethylbutadiene adduct*:

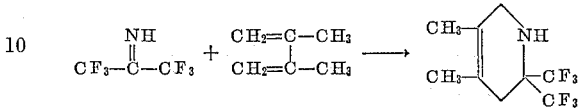

A mixture of 5.0 g. (0.03 mole) of hexafluoroisopropylidene imine and 5 ml. of 2,3-dimethylbutadiene was sealed in a Carius tube and heated at 100° C. for 18 hours. The tube was cooled, openend, and the contents distilled under reduced pressure to give 5.4 g. (74%) of 2,2-bis-trifluoromethyl-4,5-dimethyl - 1,2,3,6 - tetrahydropyridine as a colorless liquid, B.P. 44° C. (5 mm.); $n_D^{25}$, 1.3911. The infrared and n-m-r spectra were consisted with the proposed structure.

*Analysis.*—Calcd. for $C_9H_{11}F_6N$: C, 43.73; H, 4.49; F, 46.12; N, 5.67. Found: C, 44.16; H, 4.52; F, 46.19; N, 5.38

This product showed activity in the control of bacterial spot disease in pepper and tomato plants.

*Example II*

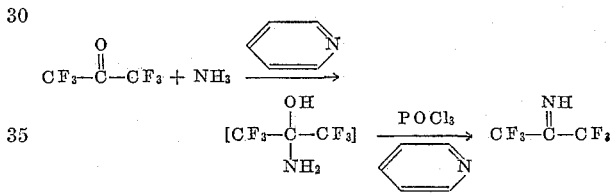

Pyridine, 500 ml., contained in a 1-liter flask fitted with a solid carbon dioxide-cooled condenser, mechanical stirrer, thermometer, and gas inlet tube, was cooled to −25° C. by means of a solid carbon dioxide-acetone bath. The stirrer was started, and 200 g. (1.2 mole) of hexafluoroacetone was distilled into the flask, keeping the solution temperature between −25 and −30° C. Ammonia, 25 ml. at −78° C. (ca. 20.4 g., 1.2 mole), was then distilled into the stirred reaction mixture, keeping the temperature between −25 and −30° C.

The cooling bath was replaced with a heating mantle, and the reaction mixture was warmed to 25° C. The solid carbon dioxide-cooled condenser was replaced with a water-cooled condenser connected to a trap cooled with solid carbon dioxide, and 100 ml. (ca. 184 g., 1.2 mole)

of phosphorous oxychloride was added dropwise at such a rate that a gentle reflux was maintained. The gas that escaped through the condenser condensed in the solid carbon dioxide-cooled trap. After the addition was completed (ca. 30 minutes), the reaction mixture was heated to 100° C. and held there for 30 minutes. The condensate in the trap was distilled through a 40 cm. packed column to give 138 g. (70% yield) of hexafluoroisopropylidene imine as a colorless liquid, B.P. 16–16.5° C.

*Example III*

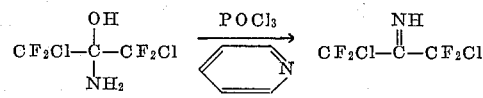

Phosphorous oxychloride, 31 g. (0.2 mole), was added dropwise to a stirred solution of 43.2 g. (0.2 mole) of 1,3 - dichloro - 1,1,3,3-tetrafluoro-2-hydroxy-2-aminopropane, prepared as subsequently described, in 100 ml. of pyridine at room temperature. The addition required about 30 minutes. The reaction mixture was then distilled, and the distillate that boiled below 100° C. was redistilled through a spinning band column to give 25.6 g. of 1,3 - dichloro-1,1,3,3-tetrafluoroisopropylidene imine as a colorless liquid, B.P. 80.5–81.5° C.; $n_D^{25}$ 1.3608. The infrared spectrum contained a band at 5.98μ. The $F^{19}$ n-m-r spectrum showed two triplets.

*Analysis.*—Calcd. for $C_3HCl_2F_4N$: C, 18.18; H, 0.51; Cl, 35.82; F, 38.38; N, 7.07. Found: C, 19.00; H, 0.60; Cl, 35.89; F, 38.06; N, 6.90.

The 1,3 - dichloro - 1,1,3,3 - tetrafluoro-2-hydroxy-2-aminopropane used in this reaction was prepared by slowly distilling 11 ml. (0.5 mole at −78° C.) of ammonia into a stirred solution of 100 g. (0.5 mole) of s-dichlorotetrafluoroacetone in 100 ml. of pentane while maintaining the temperature below 0° C. The white solid that precipitated was collected on a filter, washed with pentane, and dried in air. There was obtained 80 g. of the hydroxyamine in the form of a white powder, M.P. 67–68° C.

*Example IV*

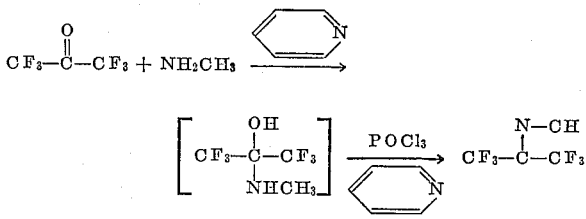

Hexafluoroacetone, 26 ml. at −78° C. (0.25 mole), was distilled into a flask containing 125 ml. of pyridine cooled to −25° C. Methylamine, 12 ml. at −10° C. (0.25 mole), was then distilled into the reaction mixture, keeping the temperature between −20 and −30° C. The reaction mixture was then allowed to warm to room temperature, and 25 ml. of phosphorous oxychloride was added dropwise over a period of 30 minutes. The mixture warmed spontaneously and began to boil. The evolved gases were condensed in a trap cooled by solid carbon dioxide. The reaction mixture was heated to 90° C. for one hour. The condensate was distilled to give 39.3 g. (87% yield) of N-methyl-1,1,1,3,3,3,-hexafluoroisopropylidene imine as a colorless liquid, B.P. 34–35° C.; $n_D^{25}$ <1.3. The infrared spectrum of this imine contained a band at 5.8μ. The $F^{19}$ n-m-r (56.4 mc.) spectrum (obtained using a high resolution spectrometer and associated electromagnet operating at 56.4 mc./sec. and approximately 14,100 gauss) contained two quartets (J=8 c.p.s.) further split to doublets (J=2.5 c.p.s. and J=1.8 c.p.s., respectively) centered at −17 c.p.s. and +345 c.p.s. relative to 1,2-difluoro-1,1,2,2-tetrachloroethane at 0.

*Analysis.*—Calcd. for $C_4H_3F_6N$: C, 26.82; H, 1.69; F, 63.67; N, 7.83. Found: C, 27.94; H, 1.98; F, 63.76; N, 7.66.

All N-alkyl polyhaloalkylidene imines of this invention, i.e., those compounds of the formula:

(3)
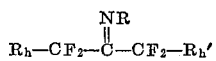

where R is alkyl, can be prepared following the procedure of Example IV, simply by substituting the desired primary alkyl amine, e.g., ethylamine, pentylamine, heptylamine, decylamine, dodecylamine, tetradecylamine or octadecylamine, and the appropriate polyhaloketone, e.g., perfluorodiethyl ketone, s-dichlorotetrafluoroactone, 1H, 7H - dodecafluoroheptane-3-one, trichlorotrifluoroactone, 1H,9H-hexadecafluorononane-5-one, 1,16-dichloroperfluoropentadecane-8-one or tetrachlorodifluoroacetone, for methylamine and hexafluoroacetone, respectively.

*Example V*

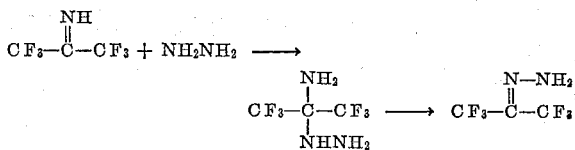

Hexafluoroisopropylidene imine (Example I), 50 ml. at −10° C. (about 0.5 mole or 82.5 g.), was slowly distilled into a flask containing 16 g. (0.5 mole) of hydrazine cooled to 0° C. This reaction mixture was then poured into a simple still containing 150 g. of phosphorous pentoxide. The still was heated until all volatile material was distilled off. The distillate was redistilled through an 18-inch spinning band column to give 50.8 g. (56% conversion, 68% yield) of hexafluoroacetone hydrazone, B.P. 95.5–96° C. $n_D^{25}$ 1.3298 and 8.5 ml. (about 14 g., 17%) of recovered imine, B.P. 15–16° C. The proton n-m-r spectrum (obtained using a high resolution spectrometer and associated electromagnet operating at 56.4 mc./sec. and approximately 14,100 gauss) of the hydrazone showed a broad singlet at 2.65τ. The $F^{19}$ n-m-r spectrum showed two quadruples centered at −45 and +30 c.p.s. (J=6 c.p.s.) relative to 1,1,2,2-tetrachloro-1,2-difluoroethane at 0.

*Analysis.*—Calcd. for $C_3H_2F_6N_2$: C, 20.01; H, 1.12; F, 63.32; N, 15.56. Found: C, 20.42; H, 1.40; F, 63.04; N, 15.31.

All polyhaloalkyl hydrazones of this invention can be prepared by substituting the appropriate polyhaloalkylidene imine (R=H), e.g., one of the imines illustrated above in table I, for hexafluoroisopropylidene imine in the process of Example V.

The polyhaloalkylidene imines (R=H) and N-alkyl polyhaloalkylidene imines (R-alkyl) of this invention are converted to gem-diamines by reaction with at least an equivalent amount of ammonium, and these diamines can be reacted with diisocyanates to form polyureas, which are useful as laminating adhesives, or they can be reacted with dicarboxylic acids to form polyamides. Reduction of the imines leads to the corresponding amines which are useful per se or as intermediates in the chemical syntheses.

The hydrazones (R=NH2) are useful as intermediates in chemical syntheses, particularly in reactions involving reduction of carbonyl groups, such as in alrehydes and ketones. Reduction of the hydrazones with sodium amalgam, electrolytically or catalytically, leads to the corresponding amines and thus provides a route to such compounds.

Since obvious modifications and equivalents in the invention will be evident to those skilled in the chemical arts, I propose to be bound solely by the appended claims.

The embodiments of the invention in which an exclusive property or privilege is claimed are defined as follows:
1. A compound of the formula:

$$R_h\text{—}CF_2\text{—}\overset{\overset{NR}{\|}}{C}\text{—}CF_2\text{—}R_h'$$

wherein R is of the group consisting of hydrogen, amino and alkyl of up to 18 carbons; and $R_h$ and $R_h'$ are selected from the group consisting of halogen of atomic number 9–17 and haloalkyl of up to 6 carbons selected from the group consisting of perfluoroalkyl, chloroperfluoroalkyl and ω-hydroperfluoroalkyl.

2. Hexafluoroisoproylidene imine.
3. Hexafluoroacetonehydrazone.
4. N - methyl - 1,1,1,3,3,3 - hexafluoroisopropylidene imine.
5. 1,3-dichloro-1,1,3,3-tetrafluoroisopropylidene imine.
6. A process of preparing polyhaloalkylidene imines in which all halogens are of atomic number 9–17 which comprises (A) contacting and reacting, at a temperature in the range —50° C. to 0° C., hydrazoic acid with a polyhalothioketone of the formula:

$$R_h\text{—}CF_2\text{—}\overset{\overset{S}{\|}}{C}\text{—}CF_2\text{—}R_h'$$

wherein $R_h$ and $R_h'$ are selected from the group consisting of halogen of atomic number 9–17 and haloalkyl of up to 6 carbons selected from the group consisting of perfluoroalkyl, chloroperfluoroalkyl and ω-hydroperfluoroalkyl; and (B) warming the resultant reaction mixture to a temperature in the range 20° C. to 100° C.

7. The process of claim 6 wherein the thioketone is hexafluorothioacetone.
8. The process of claim 6 wherein the thioketone is incrementally added to hydrazoic acid at a temperature between —50° C. and 0° C., and the reaction mixture is then warmed to a temperature between 40° C. and 60° C.
9. A process of preparing polyhaloalkylidene imines and N-alkyl polyhaloalkylidene imines which comprises
   (A) initially preparing an amino, hydroxy-substituted polyhaloalkane by reacting, at a temperature maintained between —50° C. and 10° C., a ketone of the formula $$R_h\text{—}CF_2\text{—}\overset{\overset{O}{\|}}{C}\text{—}OF_2\text{—}R_h'$$

wherein each of $R_h$ and $R_h'$ is of the group consisting of fluorine, chlorine and haloalkyl of up to 6 carbons selected from the group consisting of perfluoroalkyl, chloroperfluoroalkyl and ω-hydroperfluoroalkyl, with a compound of the formula $RHN_2$, wherein R is of the group consisting of hydrogen and alkyl of up to 18 carbons; and (B) warming a mixture of the amino, hydroxy-substituted polyhaloalkane prepared in step (A), a dehydrating agent of the group consisting of phosphorous oxychloride and phosphorous pentoxide and an acid acceptor of the group consisting of sodium carbonate and pyridine to its reflux temperature.

10. The process of claim 9 wherein hexafluoroacetone is reacted with ammonia.
11. The process of claim 9 wherein s-dichlorotetrafluoroacetone is reacted with ammonia.
12. A process of claim 9 wherein hexafluoroacetone is reacted with methylamine.
13. A process of preparing polyhaloalkylhydrazones which comprises:
   (a) initially preparing an amino, hydraza-substituted polyhaloalkane by reacting, at a temperature maintained between —50° C. and 10° C., hydrazine with a polyhaloalkylidene imine of the formula $$R_h\text{—}CF_2\text{—}\overset{\overset{NH}{\|}}{C}\text{—}CF_2\text{—}R_h'$$

wherein each of $R_h$ and $R_h'$ is of the group consisting of halogen of atomic number 9–17 and haloalkyl of up to six carbons selected from the group consisting of perfluoroalkyl, chloroperfloroalkyl and ω-hydroperfluoroalkyl; and
   (b) heating a mixture of a deaminating agent of the group consisting of phosphorous oxychloride and phosphorous pentoxide and the amino, hydrazino-substituted polyhaloalkane from step (a) to a temperature of 90° to 250° C.

14. The process of claim 13 wherein hexafluoroisopropylidene imine is reacted with hydrazine.

References Cited by the Examiner

UNITED STATES PATENTS

| | | | |
|---|---|---|---|
| 2,219,879 | 10/1940 | Vanderbilt | 260—566 X |
| 2,420,584 | 5/1947 | Brimer et al. | 260—566 |
| 2,513,996 | 7/1950 | Haury | 260—566 |
| 2,583,729 | 1/1952 | Deanesly | 260—566 X |
| 2,700,681 | 1/1955 | Blomberg | 260—566 |

OTHER REFERENCES

Cook et al., J. Chem. Soc. (London), vol. of 1949, pp. 1074–1078.

Makarov et al., Dokl. Akad. Nauk., S.S.R., vol. 141, pp. 357–360 (1961).

Sauers, J.A.C.S., vol. 81, pp. 4873–4876 (1959).

Weston et al., J.A.C.S., vol. 73, pp. 1381–1382 (1951).

CHARLES B. PARKER, *Primary Examiner.*